United States Patent [19]

Dudley et al.

[11] Patent Number: 4,760,909

[45] Date of Patent: Aug. 2, 1988

[54] SUCTION DIVERTER

[76] Inventors: Peter B. Dudley, 16359 Shady View La., Los Gatos, Calif. 95030; Edmond R. Dudley, 19941 Lanark Dr., Saratoga, Calif. 95070

[21] Appl. No.: 931,671

[22] Filed: Nov. 17, 1986

[51] Int. Cl.⁴ .............................................. B65G 47/46
[52] U.S. Cl. .................................... 198/369; 198/372; 198/438; 209/643
[58] Field of Search ...................... 198/369, 372, 438; 209/643

[56] References Cited

U.S. PATENT DOCUMENTS

| 3,133,638 | 5/1964 | Calhoun | 209/643 |
| 3,721,340 | 3/1973 | Kruse et al. | 209/643 |
| 4,391,372 | 7/1983 | Calhoun | 198/438 |
| 4,457,420 | 7/1984 | Ducloux | 198/438 |
| 4,474,295 | 10/1984 | Braschos | 198/372 |

Primary Examiner—Joseph E. Valenza
Attorney, Agent, or Firm—Thomas E. Schatzel

[57] ABSTRACT

A suction wheel is mounted laterally adjacent a horizontal conveyor and at an elevation slightly thereabove. The suction wheel is movable laterally between that position and an inward position partially overlapping the conveyor. A plurality of peripheral ports are provided in the suction wheel which is mounted for rotation about a vertical axis at a peripheral speed correspond to the speed of the conveyor. A manifold rests upon the suction wheel, but is held stationary against rotation. The manifold has at least three ports disposed in the path of movement of the suction wheel ports. A vacuum source is operatively coupled to at least two ports in the manifold, and a pressurized fluid source is operatively coupled to at least one of the ports in the manifold. The suction wheel operates intermittently. Only when an article is to be removed from the conveyor, does the suction wheel move inwardly to remove the reject articles.

4 Claims, 4 Drawing Sheets

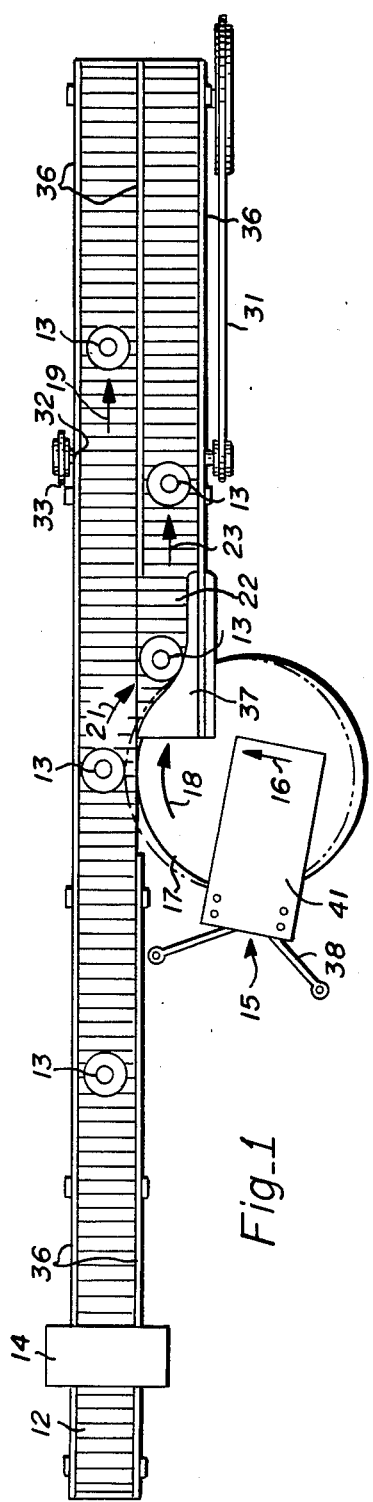
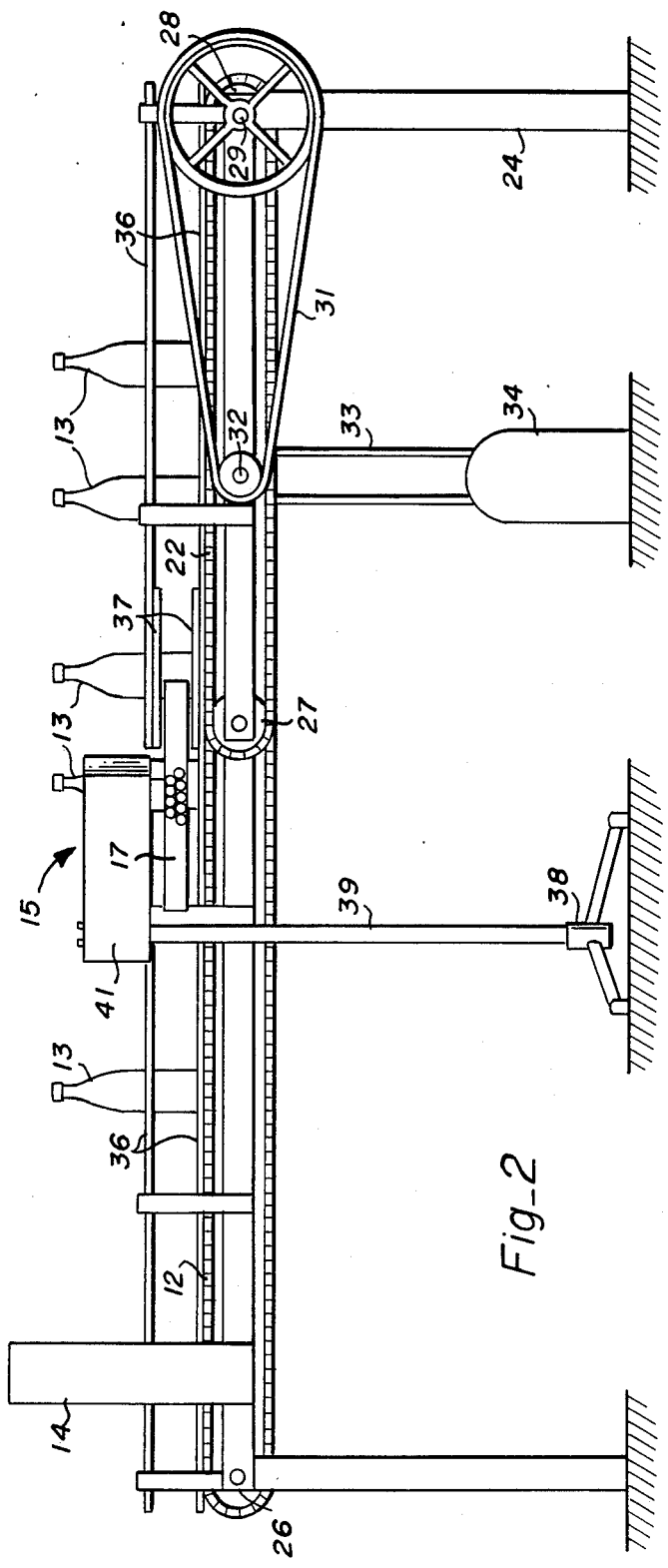

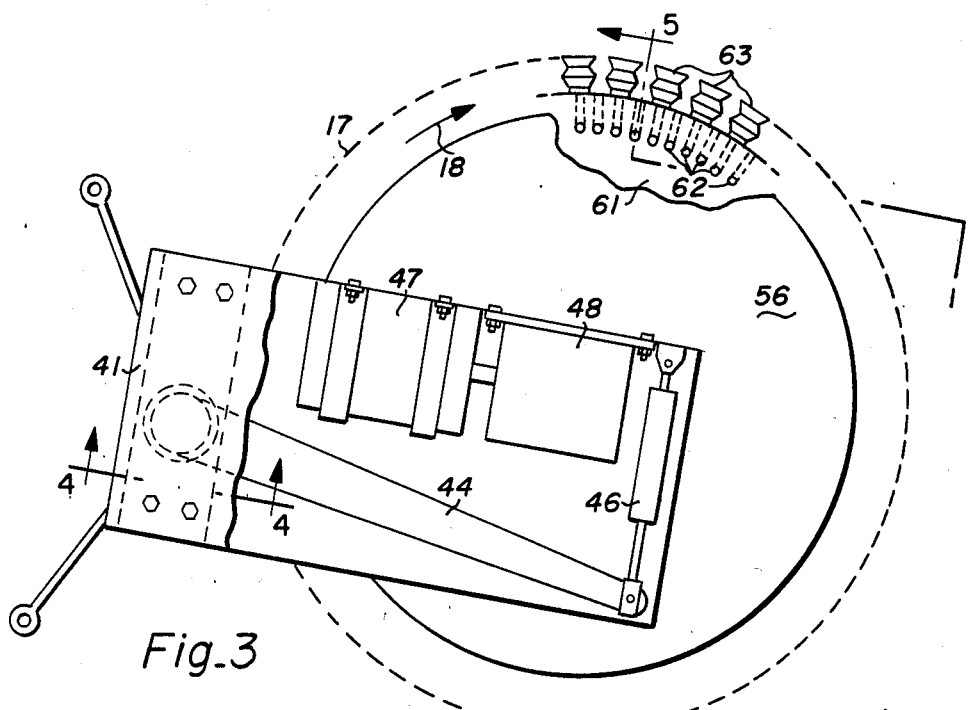
Fig_3
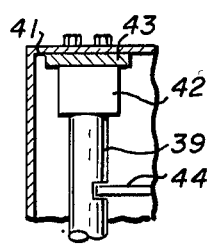
Fig_4
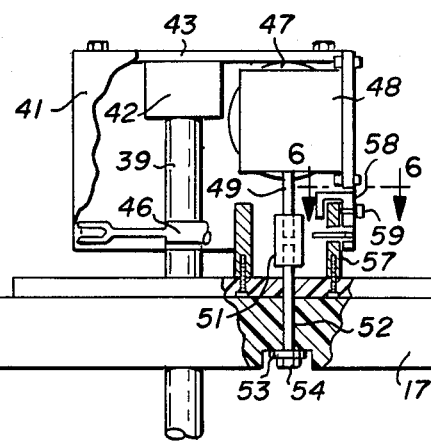
Fig_5
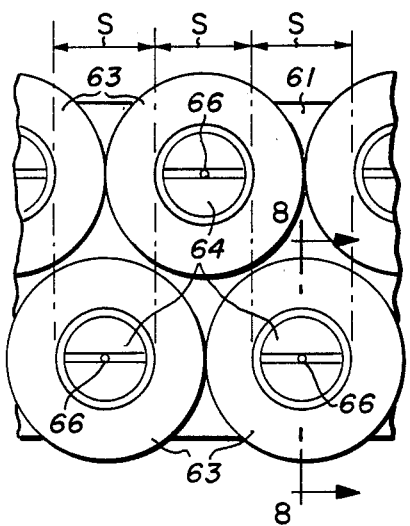
Fig_7
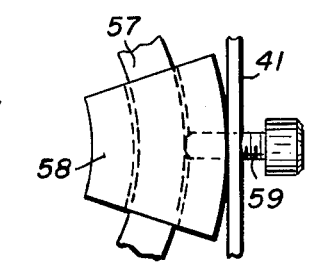
Fig_6
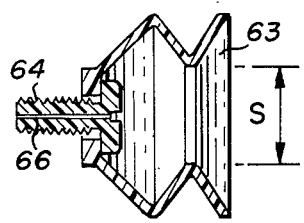
Fig_8

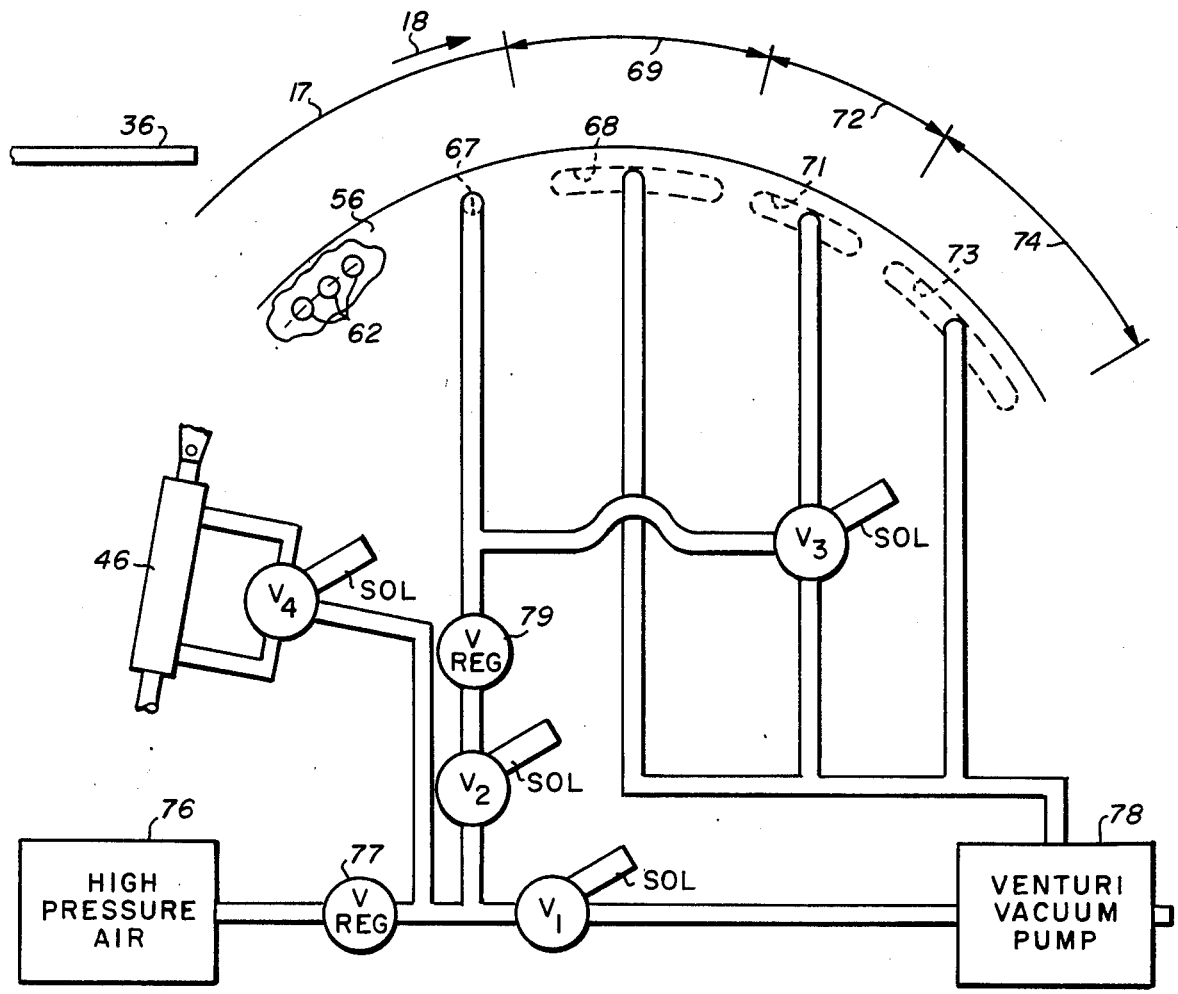
Fig_9

SUCTION DIVERTER

BACKGROUND OF THE INVENTION

1. Field of the Invention

This invention relates generally to apparatus for selectively removing articles from a conveyor. More specifically, it concerns a suction diverter that operates intermittently, and when activated, moves laterally above the conveyor for guiding acceptable articles therealong and for guiding rejected articles therefrom.

2. Description of the Prior Art

Vacuum starwheels have been used for diverting articles, such as bottles, into one of a number of conveyor lines. Examples of such vacuum starwheels are disclosed by U.S. Pat. Nos. 4,391,372, issued July 5, 1983 to Fredrick L. Calhoun; 3,279,599, issued Oct. 18, 1966 to J. G. Drennan; and 2,800,226, issued July 23, 1957 to J. G. Drennan. These starwheels operate continuously contacting every bottle passing through, while the number of reject bottles can be relatively few. This continuous use increases wear on the vacuum starwheels. Some starwheels are turned by frictional contact with bottles moving along the conveyor. Thus, they require filling multiple pockets with bottles until sufficient friction builds up between the bottles and the conveyor to overcome the friction on the starwheels contacting the bottles. Slippage of bottles on the conveyor and back-up of bottles at a starwheel interfer with any control timing based upon conveyor speed between between an inspection station and the starwheel.

Starwheels limit the use of bottle sorting equipment to a narrow range of bottle sizes that interfit within pockets of the starwheels. It is desirable to provide more versatility for sorting equipment to handle various sized bottles. A problem with diverters that move laterally above a conveyor is obstructing the flow of articles. A moving article that contacts the diverter, an adjacent guide rail, or another article, often alters speed. That limits the use of control timing based upon conveyor speed. Thus, it is desirable for the diverter to guide articles moving along the conveyor at a constant speed corresponding to conveyor speed.

SUMMARY OF THE PRESENT INVENTION

An object of the present invention is to provide a suction diverter that operates intermittently by moving laterally above a conveyor for selectively removing articles therefrom.

Another object of the invention is to provide a suction diverter that when positioned above a conveyor guides articles moving along the conveyor at a constant speed corresponding to conveyor speed.

A further object of the invention is to provide a suction diverter having more versatility for handling articles of various size and shape.

Briefly, the present invention includes a suction wheel mounted laterally adjacent a horizontal conveyor at an elevation slightly above the conveyor. The suction wheel is movable between that position and a position laterally inward partially overlapping the conveyor. A plurality of peripheral ports are provided in the suction wheel which is mounted for rotation about a vertical axis at a peripheral speed corresponding to that of the conveyor. A manifold rests upon the suction wheel but is held stationary against rotation. The manifold has at least three ports disposed in the path of movement of the suction wheel ports. A vacuum source is operatively coupled to at least two ports in the manifold and a pressurized fluid source is operatively coupled to at least one of the ports in the manifold.

Advantages of the invention include less wear and maintenance on the suction diverter due to intermittent operation that requires moving above a conveyor only when an article is to be removed; accurate control timing due to maintaining the flow of articles at the speed of the conveyor; versatility for handling articles of various size and shape; and stability of conveyed articles maintained by a positive suction grip.

These and other objects and advantages of the present invention will no doubt become obvious to those of ordinary skill in the art after having read the following detailed description of the preferred embodiment which are illustrated in the various drawing figures.

IN THE DRAWINGS

FIG. 1 is a plan view of conveying and inspection equipment including a suction diverter embodying the present invention;

FIG. 2 is a side elevation view of the equipment shown in FIG. 1;

FIG. 3 is an enlarged plan view with portions broken away to show underlying structure of the suction diverter shown in FIG. 1;

FIG. 4 is a fragmentary view in elevation taken on the line 4—4 of FIG. 3;

FIG. 5 is a broken front view taken on the line 5—5 of FIG. 3;

FIG. 6 is an enlarged section taken on the line 6—6 of FIG. 5;

FIG. 7 is an enlarged elevational view taken on the line 7—7 of FIG. 5;

FIG. 8 is a section taken on the line 8—8 of FIG. 7;

FIG. 9 is a pneumatic diagram for the suction diverter shown in FIG. 3; and

DESCRIPTION OF THE PREFERRED EMBODIMENT

Figure 10:
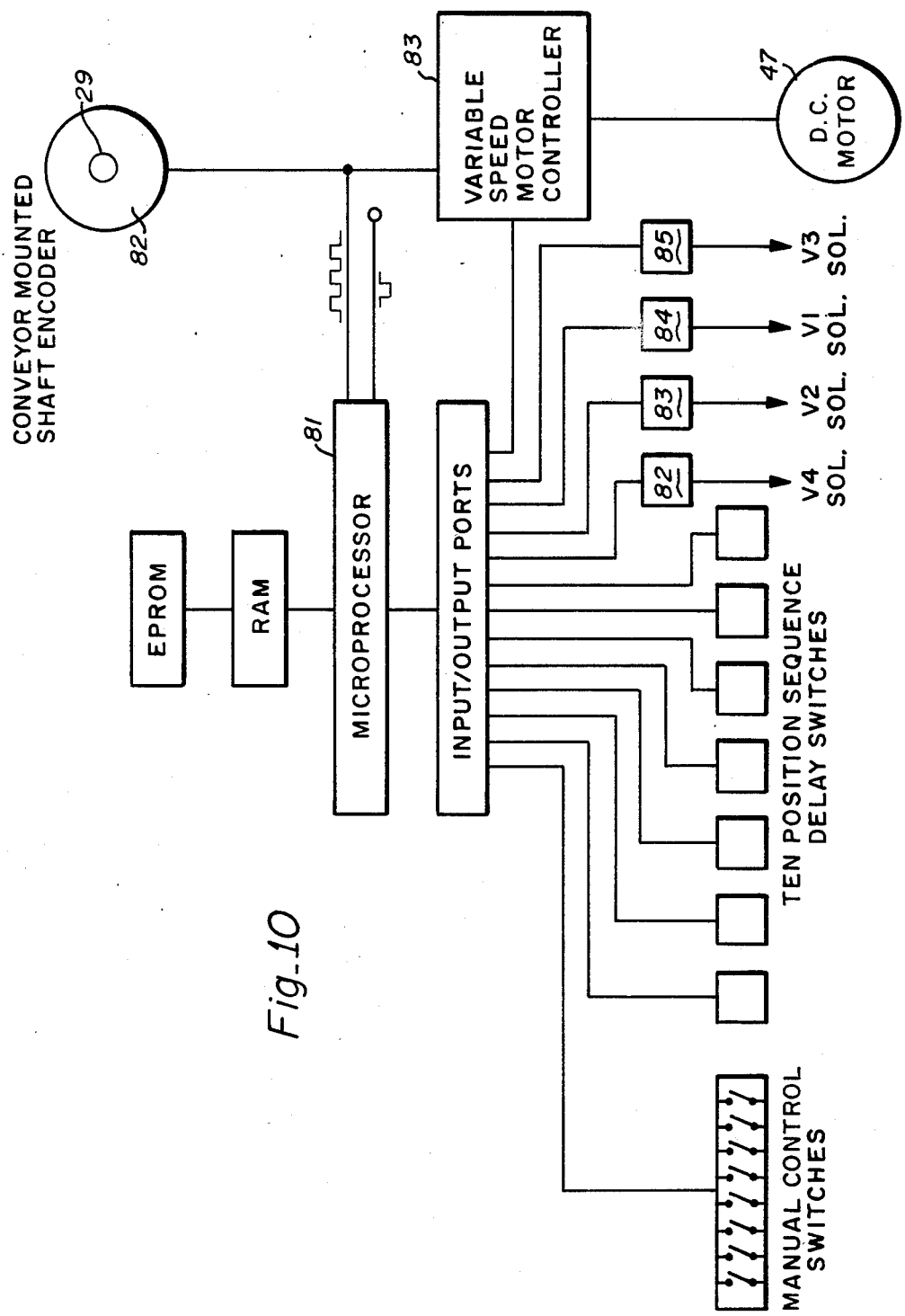
FIG. 10 is a block diagram representing the electrical control for the suction diverter.

With reference to FIG. 1, a conveyor 12 transports articles, such as the bottles 13, through an inspection station 14 to a suction diverter, indicated generally by reference numeral 15. The suction diverter is movable in the direction of an arrow 16 and has a suction wheel 17 indicated in solid line adjacent the conveyor. The suction wheel is movable, after reject bottles are detected at the inspection station, to the position indicated in phantom line superimposing part of the conveyor. The suction wheel is rotatable in the direction of arrow 18 at a speed corresponding to the speed of the conveyor 12, and suction is applied for grasping the bottles 13. Acceptable bottles are guided by the suction wheel along the conveyor in the direction of an arrow 19. Reject bottles are guided in the direction of arrow 21 from the conveyor 12 to an adjacent conveyor 22 that advances the reject bottles in the direction of arrow 23. After reject bottles have been removed, the suction diverter 15 returns the suction wheel 17 to the solid line position adjacent the conveyor 12 so as not to interfere with the flow of bottles thereon. Rotation of the wheel and suction for grasping bottles is stopped until another reject bottle is detected.

Looking now at FIG. 2, the conveyors 12 and 22 have a support frame 24 that includes vertical columns and horizontal beams extending both longitudinally and transversely. An idler roller 26 is mounted at the head end of conveyor 12, and an idler roller 27 is mounted at the head end of conveyor 22. A drive roller 28 is provided at the discharge ends of the conveyors 12 and 22 for driving both conveyors at the same speed. The drive roller is mounted on a drive shaft 29 that is driven by a belt and pulley drive 31 from an intermediate shaft 32 journalled in the support frame. This intermediate shaft is driven by a belt and pulley drive 33 from a motor 34.

Rails 36, as shown in FIGS. 1 and 2, are mounted from the support frame 24 for maintaining the bottles 13 in position during conveyance. At the head of conveyor 22, a pair of curved plates 37 extend laterally inward from the upper and lower rails 36, above and below the suction wheel 17. These curved plates strip from the suction wheel bottles that are diverted onto the conveyor 22.

As shown in FIG. 2, the suction diverter 15 has a tripod stand 38 that adjustably supports a post 39 on which a housing 41 is mounted for pivotal movement on the post. FIGS. 3, 4 and 5 show a sleeve 42 that is welded to a plate 43 bolted to the top of the housing. The sleeve fits about the top of the post and the plate bears thereon allowing the housing to pivot. The arm 44 is welded to the post and projects radially therefrom within the housing. A pneumatic actuator 46 is coupled between the arm and the housing so that upon expansion or contraction of the actuator, the housing pivots about the post.

A variable speed D.C. motor 47, shown in FIGS. 3 and 5, is bolted to the housing 41, as is a right angle drive gear box 48 that is coupled to the D.C. motor and has a vertical output shaft 49. A coupling 51 connects the vertical output shaft to a stub shaft 52 on which the suction wheel 17 is held in place by a washer 53 and a nut 54. While the suction wheel rotates with the stub shaft in the direction of arrow 18, a manifold 56, made of Delrin, rests upon the suction wheel and is held in a stationary position. An adjustment ring 57, made of metal such as stainless steel or aluminum, is bolted to the manifold. An adjuster 58 shown in FIGS. 5 and 6, fits like a C-clamp about the top of the adjustment ring and is locked thereto by a set screw 59 passing through the housing 41. Thus, the adjustment ring and manifold are held stationary against rotation.

As shown in FIGS. 3 and 5, the suction wheel 17 has a hub portion 61, made of high density, light weight polyethylene. Friction between the hub portion of the suction wheel and the manifold 56 made of Delrin are slight. At the periphery of the hub portion, a series of L-shaped ports 62 extend radially inward and axially upward. Suction cups 63 are mounted at the hub portion periphery in flow communication with the ports 62. As shown in FIG. 7, the suction cups are alternately spaced in upper and lower rings by a spacing S that corresponds to the internal throat diameter of the cup. Thus, suction can be applied continuously about the periphery of the suction wheel. The suction cups 63 are fastened to the hub portion by plastic screws 64 having an axial bore 66 shown in FIG. 8. Vacuucm or pressurized air can be applied to the ports 62 through the manifold 56.

Looking now at FIG. 9, the manifold 56 has a circular port 67 positioned radially above the path of trvel of the ports 62 for supplying low pressure air thereto to clear out any debris in the suction cup openings. An elongated, arcuate port 68 in the bottom surface of the manifold connects vacuum to the ports 62. Thus, suction can be applied along an arc 69 at the periphery of the suction wheel 17 for causing articles, such as the bottles 13 (FIG. 1), to adhere thereto. An elongated, arcuate port 71 in the bottom surface of the manifold connects either vacuum or low pressure air to the ports 62. This enables either adherence or removal of articles along an arc 72 at the periphery of the suction wheel. An elongated, arcuate port 73 in the bottom surface of the manifold connects vacuum to the ports 62 so that suction can be applied along an arc 74 at the periphery of the suction wheel. Articles will adhere to the wheel through the arc 74 and continue adherence on residual suction until they are stripped from the wheel by curved plates 37 (FIGS. 1 and 2). The arcuate spacing between ports 68 and 71 and ports 71 and 73 is greater than the arcuate spacing between ports 62. This prevents pressurized air from port 71 from entering the vacuum ports 68 and 73. When port 71 is connected to vacuum, for an instant between ports, articles adhere by residual suction to the suction wheel 17.

High pressure air is supplied at the source 76 and flows through a pressure regulator valve 77 and a solenoid controlled valve $V_1$ to a venturi vacuum pump 78. A solenoid controlled valve $V_2$ and a pressure regulator valve 79 control the flow of low pressure air to the port 67 and to a solenoid controlled valve $V_3$ that controls the flow to the port 71. High pressure air passes from the valve 77 to a solenoid controlled valve $V_4$ that operates the pneumatic actuator 46. The vacuum pump is connected to ports 68 and 73 and to the solenoid controlled valve $V_3$ that controls the application of vacuum to the port 71.

With reference to FIG. 10, the suction diverter 15 is controlled by a microprocessor 81. An electrically programmable read only memory (EPROM) provides storage for the program used by the microprocessor. A random access memory (RAM) is used for temporary storage of variables by the microprocessor. Input/output ports interface with various manually set switches, ten position sequence delay switches, and solenoid driver transistors 82, 83, 84 and 85. Transistor 82 controls the valve $V_4$ solenoid. Transistor 83 controls the valve $V_2$ solenoid. Transistor 84 controls the valve $V_1$ solenoid and transistor 85 controls the valve $V_3$ solenoid.

A shaft encoder 82 that is mounted on the conveyor drive shaft 29 sends pulses to the microprocessor 81 and to a variable speed motor controller 83. Each pulse represents a fixed increment of conveyor travel. The microprocessor counts the pulses during a reject cycle in order to track the position of articles, such as bottles 13, that are to be removed from the conveyor. Pulse timing enables the suction diverter 15 to perform various functions at the appropriate time in relationship to reject articles. The output of the shaft encoder goes to controller 83 and the frequency of the pulses is used to vary the speed of the D.C. motor 47. Thus, the peripheral speed of the suction wheel 17 will be equal to the speed of the conveyor 12.

In operation, the microprocessor receives a signal from the inspection station 14 that a reject article 13 has been detected. Following the program in the EPROM, the microprocessor will begin a sequence of actions for removal of the reject article from the conveyor line 12. These actions include reading the sequence delay switches, calculating the timing (encoder pulse count) of various functions and begin counting encoder pulses.

After the appropriate number of pulses, the following steps are taken:
1. Turn on the motor 47;
2. Operate solenoid controlled valve $V_2$ to turn on purge air;
3. Operate solenoid controlled valve $V_4$ to move the suction wheel 17 over the conveyor;
4. Operate solenoid controlled valve $V_1$ to turn on vacuum;
5. Operate solenoid controlled valve $V_3$ to apply vacuum to the port 71;
6. Operate solenoid controlled valve $V_3$ to shut off vacuum;
7. Operate solenoid controlled valve $V_4$ to move suction wheel 17 outward adjacent the conveyor;
8. Operate solenoid controlled valve $V_2$ to turn off purge air; and
9. Turn off motor 47.

If subsequent reject articles are detected during a reject cycle, the microprocessor will alter the above sequence until all detected reject articles are removed before moving the suction wheel 17 outward adjacent the conveyor.

Although the present invention has been described in terms of the presently preferred embodiment, it is to be understood that such disclosure is not to be interpreted as limiting. Various alterations and modifications will no doubt become apparent to those of ordinary skill in the art after having read the above disclosure. Accordingly, it is intended that the appended claims be interpreted as covering all alterations and modifications as fall within the true spirit and scope of the invention.

We claim:

1. A suction diverter system for removing selected articles from a horizontal conveyor, said system comprising:
   a suction wheel mounted laterally adjacent the conveyor at an elevation slightly above that of the conveyor and having an innermost edge relative to the conveyor, said suction wheel having a plurality of peripheral ports at which a vacuum can be drawn for causing articles moving along the conveyor to adhere thereto;
   means for rotating the suction wheel about a vertical axis with the innermost edge moving in the direction of conveyor movement and at a corresponding peripheral speed;
   a manifold held stationary against rotation and that rests upon the suction wheel through which a vacuum can be drawn at the peripheral ports of the suction wheel;
   inspection means for examining articles on the conveyor and providing control signals indicative of articles to be removed from the conveyor;
   positioning means responsive to said control signals of the inspection means for moving the suction wheel laterally relative to the conveyor between two positions, one position having the suction wheel withdrawn from the path of articles moving along the conveyor for avoiding article contact when no articles are to be removed, and the other position having the suction wheel inserted into the path of articles moving along the conveyor for contacting articles when an article is to be removed; and
   control means responsive to said control signals of the inspection means for selectively drawing a vacuum at peripheral ports of the suction wheel to hold a selected article thereto for removal from the conveyor.

2. The suction diverter system of claim 1 further including stripping means fixed at a location along the conveyor for stripping from the rotating suction wheel vacuum held articles that have been removed from the conveyor.

3. A suction diverter system for regulating articles moving along a horizontal conveyor, said system comprising:
   a suction wheel mounted laterally adjacent the conveyor and having a periphery at which vacuum can be applied for causing articles moving along the conveyor to adhere thereto and at which fluid of at least atmospheric pressure can be applied to break the adherence of articles thereto, said suction wheel being mounted for rotation in a horizontal plane at an elevation slightly above that of the conveyor and having an innermost edge relative to the conveyor;
   means for rotating the suction wheel with the innermost edge moving in the direction of conveyor movement and at a corresponding peripheral speed;
   inspection means for examining articles on the conveyor and providing control signals indicative of articles to be removed from the conveyor;
   positioning means responsive to said control signals of the inspection means for moving the suction wheel laterally relative to the conveyor between two positions, one position having the suction wheel withdrawn from the path of articles moving along the conveyor for avoiding article contact when no articles are to be removed from the conveyor, and the other position having the suction wheel inserted into the path of articles moving along the conveyor for contacting articles when an article is to be removed; and
   control means responsive to said control signals of the inspection means for selectively applying vacuum to the periphery of the suction wheel to hold a selected article thereto for removal from the conveyor.

4. The suction diverter system of claim 3 wherein said positioning means for moving the suction wheel laterally of the conveyor includes a pneumatic actuator, and further including;
   a housing to which said suction wheel rotating means is mounted with the suction wheel depending therefrom;
   a post on which the housing is mounted for pivotal movement horizontally thereon;
   an arm that projects horizontally from the post within the housing; and
   said pneumatic actuator being coupled between the arm and the housing so that upon expansion or contraction of the actuator, the housing pivots upon the post.

* * * * *